M. A. CRAVATH & I. M. CRAVATH, dec'd.,
J. S. CORBIN assignee of said M. A. CRAVATH and E. E. CRAVATH, administratrix of I. M. CRAVATH.
Revolving Plow.
No. 9,603. Reissued March 15, 1881.
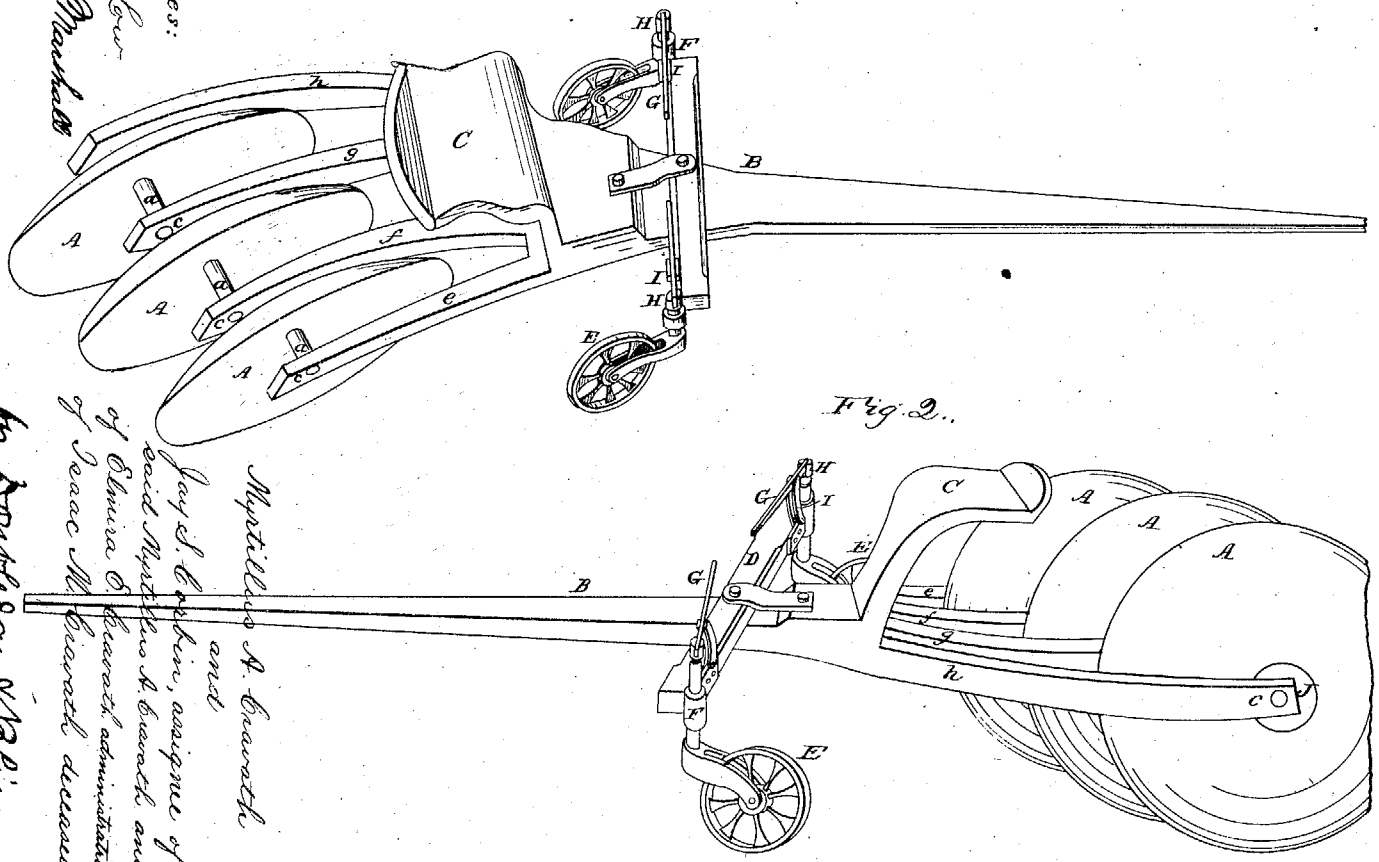
Witnesses:
N. N. Low
L. H. Marshall
Myrtillus A. Cravath and Jay S. Corbin, assignee of said Myrtillus A. Cravath and of Elmira E. Cravath administratrix of Isaac M. Cravath deceased,
by Doubleday & Bliss attys.

UNITED STATES PATENT OFFICE.

MYRTILLUS A. CRAVATH, OF BLOOMINGTON, ILLINOIS, AND JAY S. CORBIN, OF GOUVERNEUR, NEW YORK; SAID CORBIN ASSIGNEE OF SAID M. A. CRAVATH AND OF ELMIRA E. CRAVATH, ADMINISTRATRIX OF ISAAC M. CRAVATH, DECEASED.

REVOLVING PLOW.

SPECIFICATION forming part of Reissued Letters Patent No. 9,603, dated March 15, 1881.

Original No. 66,802, dated July 16, 1867. Application for reissue filed November 23, 1880.

*To all whom it may concern:*

Be it known that MYRTILLUS A. CRAVATH and ISAAC M. CRAVATH, citizens of the United States, of Bloomington, in the county of McLean and State of Illinois, did invent certain new and useful Improvements in Revolving Plows; and I do hereby declare the following to be a full, clear, and exact description of the invention, that will enable others skilled in the art to which it appertains to make and use the same, reference being had to the accompanying drawings, and to letters of reference marked thereon, which form a part of this specification.

Figure 1 is a perspective ~~view of the imple~~ment from the rear and furrow side. Fig. 2 is a side elevation of the same, taken on the land-side of the implement, as in the act of plowing.

A A A are the plows. *a a a* are the axles. B is the frame of the implement. *e f g h* are the arms. C is the seat. D is the whiffletree. E E are the wheels. F F are the slides. G G are the bent levers. H H are the swivels. I I are the curved straps. J is the concave flange on axle *a*.

The plows A A A are constructed each of a single plate of steel, circular in form and concave in shape, with the edge sharpened, with the bevel on the outer convex side, and provided with an axle, *a*, through its center, upon which to revolve. Said axle has a journal at each end, and a concave flange, J, near one end and adjoining the journal. Said flange is secured to the outer or convex side of the plows A A A by means of bolts. The plows A A A are secured to the frame B by the journals being passed through the holes in the end of the arms *e f g h*, as shown at *e*.

The frame B, to which the plows A A A are attached, is constructed with a tongue of common shape, having arms *e f g h* attached, of different shapes and lengths, according to the number of plows designed to be used.

The seat C is placed forward of the plows A A A on frame B, the weight of the driver being used to enforce the action of said plows.

The whiffletree D is forward of the seat C on frame B.

The wheels E E are of the common caster pattern, and are attached to the whiffletree D by means of the slides F F, and are operated by means of the bent levers G G, said levers being attached to the wheels E E by means of the swivels H H, and being also attached to the slides F F by means of the curved straps I I.

The plows A A A can be used singly, or any desired number can be used together. They can be more or less concave, according to the size of the plows and the width and depth of ~~the furrow desired to be plowed. A plow three~~ feet in diameter, concaved to a six-foot circle, will cut and thoroughly pulverize a furrow-slice nine inches in width and fourteen inches in depth.

The arm *e* on frame B, for the size of the plow herein mentioned, may be two and a half feet in length, size two inches by four at the extreme end, and fixed at an angle of about twenty degrees from the center line of the tongue, the axle of the plow being set at right angles with arm *e*. The arm *f* is curved so as to bring it to the same angle with arm *e* at the place where it receives the axle *a*, the arm *f* being long enough to admit of placing the second plow about nine inches in rear of the first and holding one journal of each axle of the first and second plows, the same operation to be repeated as often as another plow is added.

The operation is as follows: The levers G G are lowered, sufficient weight placed upon the seat C to cause the plows A A A to enter the earth to the required depth. As it advances the resistance of the earth causes the said plows to revolve. The furrow-slice is cut on a curved line. The plows A A A, revolving at an angle of about twenty degrees from the line of draft, move the furrow-slice to the right, the revolving or centrifugal motion of the same lifting and thoroughly pulverizing the soil. The weight of the furrow-slice on the rear of the concave and the pressure on the front of the convex at entering the earth compensate for the plows revolving at an angle to the line of draft. In turning the implement the levers G G are lifted and carried over until the curved straps I I′ rest against the swivels H H.

What I claim is—

1. In a rotating disk-plow, a rotating concavo-convex plow constructed of a single plate of metal, arranged, substantially as described, to have its front edge cut the soil, and adapted to turn the soil to form a furrow.

2. In a plow, a revolving concavo-convex cutting-disk mounted upon and attached directly to the tongue or draft-frame, substantially as described.

3. The combination, with a draft-frame, of a revolving concavo-convex disk arranged, substantially as described, to cut the soil to form the furrow, and mounted on said frame obliquely to the line of draft.

4. The combination of a plow-frame, revolving disk-plows below said frame, and a driver's seat adapted to have the driver's weight enforce a uniform cutting action of the disks.

5. The combination of a draft-frame and a gang of two or more concavo-convex disk-plows, arranged with the concave sides toward the front and at an angle with the line of draft.

6. The combination of a draft-tongue, rotating concavo-convex cutting-disks, rotating axles for said disks, adapted to hold the concave sides of the disks in the direction of the draft, and an intermediate frame which connects said axles to the tongue.

7. In a revolving plow, the combination of a concavo-convex cutting-disk and a rotating axle which has one end mounted in the rear of the other to hold the concave side of the disks in the direction of the draft.

8. In a revolving plow, the combination, with the connecting frame, of the rotating concavo-convex cutting-disks, adapted to support said frame above the ground and to have the concave sides at an angle to the line of draft.

9. In a revolving plow, the combination, with the supporting-frame, of a gang of rotating concavo-convex cutting-disks arranged in parallel planes, and adapted to have all the concave sides throw the soil in one direction.

10. The combination, with the rotating plows A and the axles *a*, of the arms *e f g h*, of different lengths, and each arranged to support the ends of two of said axles.

11. The combination of the slides F F, the bent levers G G, the swivels H H, and the curved straps I I to operate the wheels E E, as set forth.

In testimony whereof I affix my signature in presence of two witnesses.

MYRTILLUS A. CRAVATH.

Witnesses:

J. B. COLLINS,

W. H. THOMS.